Patented June 7, 1949

2,472,379

UNITED STATES PATENT OFFICE 2,472,379

BATTERY ELECTROLYTE WITH PHOSPHORIC ACID

Herbert E. Lawson, Chevy Chase, Md., assignor to the United States of America as represented by the Secretary of the Navy No Drawing. Application September 20, 1943, Serial No. 503,157

8 Claims. (Cl. 136—154)

This invention relates to conducting solutions for activating electric batteries and has particular relation to contact electrolytes for use in deferred action type batteries for electrically operated projectiles.

Electrolytes for use in deferred action type batteries employed for supplying electricity at suitable operating voltages for projectiles must be capable of functioning at the extreme and rapidly varying temperatures to which projectiles are often subjected. The electrical assemblies of these projectiles must be operable at all climatic temperatures present on the surface of the earth and at high altitudes. Although the well-known lead-oxide, hydrochloric acid, zinc battery has desirable voltage and temperature characteristics for this use, it is not suitable for this purpose because the life of the battery is extremely short due to the formation of lead trees on the zinc electrode resulting in short-circuiting of the battery. Thus there exists a distinct need for an electrolyte which is operative at extremely low and high climatic temperatures, and which has a minimum difference in voltage output at low and high temperatures, and a wide temperature range, between maximum and minimum critical temperatures.

An object of the present invention is to provide an electrolyte for use in deferred action type batteries which will operate efficiently at extremely low and high temperatures.

Another object of the invention is to provide an electrolyte which will maintain a minimum difference in voltage output at extremely low and high temperatures.

A further object of the invention is to provide an electrolyte which, by preventing the formation of metallic lead on the negative electrode, will prevent short-circuiting of a battery having a lead positive electrode, a zinc negative electrode and a hydrochloric acid electrolyte.

A still further object of the invention is to provide an electrolyte of a sufficiently low viscosity so that uniform activation within a minimum time will be assured.

These and other objects of the invention will be understood by reference to the following description.

The electrodes to be used with the improved electrolyte are preferably formed of lead and zinc, or lead and iron. The lead electrode constitutes the positive electrode, while the zinc or iron constitutes the negative electrode. Lead dioxide is employed as a depolarizer and is formed from the lead positive electrode, preferably by oxidation in a sulfate bath. One suitable bath is a solution of magnesium sulfate in water, between about 350 and 550 grams per liter, to which a trace of an activator, such as a soluble nitrate, may be added if desired. Zinc and lead electrodes will produce a relatively high voltage. If the voltage is higher than that desired, an iron electrode may be substituted for the zinc, thereby resulting in a substantial reduction in voltage. These electrodes, or multiples thereof, are mounted in close proximity to each other and to an ampoule of glass or other frangible material containing the contact electrolyte. When it is desired to activate the battery, the ampoule containing the electrolyte is broken and the electrolyte flows about the electrodes, thereby instituting the electrochemical reaction. This type of battery is known as a wet primary deferred action battery.

The electrolyte which embodies the present invention comprises an acid selected from the group consisting of hydrochloric acid, hydrobromic acid and sulfuric acid, with ortho-phosphoric acid and water, and, if desired, a small percentage of mercuric chloride.

The acid in the water solvent reacts with the zinc or iron electrode to produce the electrolysis which develops the voltage across the electrodes in the well-known manner. However, the lead dioxide is rapidly attacked by the acid solution and the lead salts formed thereby are decomposed at the negative electrode and deposit metallic lead thereon. In view of the fact that the electrodes are spaced extremely close to each other, some means must be employed to prevent the formation of metallic lead clusters upon the surface of the negative electrode and their bridging across to the lead electrode and short-circuiting the cell.

It has now been discovered that the addition of ortho-phosphoric acid to the electrolyte solution will prevent the formation of lead clusters for a sufficient time to permit the battery to operate properly for the purpose intended. An increase in the percentage of ortho-phosphoric acid will increase the viscosity of the solution, thereby delaying the activation time of the battery at low temperatures. An increase in the amount of ortho-phosphoric acid will result in a lowering of the voltage output of the battery at low temperatures, particularly when the battery is subjected to heavy drains.

An increase in the ratio of hydrochloric acid to ortho-phosphoric acid will result in an increase in the speed at which metallic lead clusters collect on the negative electrode. A decrease in the ratio of hydrochloric acid to ortho-phosphoric acid will result in a lowering of the voltage output at low temperatures, particularly when the battery is subjected to a heavy current consumption. A decrease in the percentage of combined acids will result in a raising of the freezing point, that is, the battery will operate less efficiently at low temperatures.

The addition of a small amount of mercuric chloride to the halogen acid electrolyte solution prevents the rapid dissolution of the negative electrode by the local action of the halogen acid.

When sulfuric acid is used as the electrolytic acid, the ortho-phosphoric acid has the effect of reducing the spread in voltage, that is, the difference in voltage output at high and low temperatures is reduced. It has also been found that the gathering of lead clusters at the negative electrode is reduced when sulfuric acid is used.

The proportions, by weight, of the components of the electrolyte may be varied within the following limits:

| | Per cent |
|---|---|
| Ortho-phosphoric acid ($H_3PO_4$) | 33.0–65.0 |
| Hydrogen chloride or hydrogen bromide | 0.8– 9.0 |
| Water | 66.2–26.0 |

A typical embodiment of the electrolyte consists of ortho-phosphoric acid (85% solution), hydrogen chloride (37% solution), water, and if desired, mercuric chloride, in such proportions that the final composition is:

| | Per cent |
|---|---|
| Hydrogen chloride (HCl) | 6.7 |
| Ortho-phosphoric acid ($H_3PO_4$) | 44.0 |
| Water | 49.3 |
| Mercuric chloride may be added, if desired | 1.0 |

The total acid content of this electrolyte is 50.7% and the ratio of hydrochloric acid to ortho-phosphoric acid is 15:100. The term ortho-phosphoric acid as used in the appended claims has reference to $H_3PO_4$.

A typical battery using the hereinabove set-forth electrolyte gives the following performance, at various temperatures and under various loads, when each electrode has an area of 0.155 in.$^2$ and the space between the electrodes is 0.007 inch.

When iron is used as the negative electrode, the performance is as follows:

| Temperature | Load | Voltage Output at start | Voltage Output at 30 Sec. | Voltage Output at 60 Sec. | Voltage Output at 90 Sec. |
|---|---|---|---|---|---|
| | Ohms | | | | |
| +70° F | 90 | 1.50 | 1.48 | 1.47 | 1.45 |
| −13° F | 90 | 1.35 | 1.35 | 1.35 | 1.35 |
| +122° F | 27 | 1.50 | 1.45 | 1.45 | 1.40 |
| −13° F | 27 | 1.32 | 1.30 | 1.27 | 1.22 |

When zinc is used as the negative electrode, the performance is as follows:

| Temperature | Load | Voltage Output at start | Voltage Output at 30 Sec. | Voltage Output at 60 Sec. | Voltage Output at 90 Sec. |
|---|---|---|---|---|---|
| | Ohms | | | | |
| +70° F | 90 | 2.18 | 2.16 | 2.08 | |
| −22° F | 90 | 1.95 | 1.95 | 1.95 | |
| −30° F | 90 | 1.70 | 1.88 | 1.85 | |
| +70° F | 27 | 2.00 | 1.95 | 1.92 | |
| −22° F | 27 | 2.05 | 1.95 | 1.35 | |
| +130° F | 300 | 2.25 | 2.24 | 2.20 | |

When concentrated sulfuric acid is used as the electrolytic acid, it may be varied in proportions, by weight, from 10 to 30%. The ortho-phosphoric acid may be varied in proportions from 10 to 30% and the water, as solvent, may be proportionally varied from 80 to 40%. A satisfactory electrolyte is as follows:

| | Per cent |
|---|---|
| Ortho-phosphoric acid ($H_3PO_4$) | 27 |
| Sulfuric acid ($H_2SO_4$) | 17 |
| Water | 56 |

I claim:

1. A contact electrolyte solution for deferred action type batteries comprising ortho-phosphoric acid, an acid selected from the group consisting of hydrochloric acid and hydrobromic acid, and water.

2. A contact electrolyte solution for deferred action type batteries comprising, by weight, from 33 to 65% ortho-phosphoric acid, 0.8 to 9.0% hydrogen chloride, and 66.2 to 26% of water.

3. A contact electrolyte solution for deferred action type batteries comprising, by weight, 44% ortho-phosphoric acid, 6.7% hydrogen chloride, and 49.3% of water.

4. A contact electrolyte solution for deferred action type batteries having a lead cathode and a zinc anode, comprising ortho-phosphoric acid, an acid selected from the group consisting of hydrochloric acid and hydrobromic acid, and water.

5. A contact electrolyte solution for deferred action type batteries comprising ortho-phosphoric acid, hydrochloric acid and water, wherein the ratio, by weight, of hydrogen chloride to phosphoric acid is from 2:100 to 15:100.

6. A contact electrolyte solution for deferred action type batteries comprising, by weight, 66.2 to 26% water, and 33.8 to 74% of a mixture containing ortho-phosphoric acid and hydrochloric acid wherein the ratio of hydrogen chloride to phosphoric acid is from 2:100 to 15:100.

7. A contact electrolyte solution for deferred action type batteries comprising ortho-phosphoric acid, hydrochloric acid, mercuric chloride, and water.

8. A contact electrolyte solution for deferred action type batteries comprising, by weight, 44% ortho-phosphoric acid, 6.7% hydrogen chloride, 1% mercuric chloride, and 48.3% water.

HERBERT E. LAWSON.

REFERENCES CITED

The following references are of record in the file of this patent:

UNITED STATES PATENTS

| Number | Name | Date |
|---|---|---|
| 1,748,485 | Kugel | Feb. 25, 1930 |
| 2,078,143 | Jumau | Apr. 20, 1937 |